(12) United States Patent
Horikawa et al.

(10) Patent No.: US 11,171,331 B2
(45) Date of Patent: Nov. 9, 2021

(54) METHOD OF MANUFACTURING POSITIVE ELECTRODE MATERIAL FOR LITHIUM ION SECONDARY BATTERY AND POSITIVE ELECTRODE MATERIAL FOR LITHIUM ION SECONDARY BATTERY

(71) Applicant: TOYOTA JIDOSHA KABUSHIKI KAISHA, Toyota (JP)

(72) Inventors: Daisuke Horikawa, Toyota (JP); Ryuta Sugiura, Toyohashi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/245,107

(22) Filed: Apr. 30, 2021

(65) Prior Publication Data

US 2021/0257611 A1 Aug. 19, 2021

Related U.S. Application Data

(62) Division of application No. 15/897,703, filed on Feb. 15, 2018.

(30) Foreign Application Priority Data

Mar. 6, 2017 (JP) .................. 2017-041771

(51) Int. Cl.
*H01M 4/36* (2006.01)
*H01M 10/0525* (2010.01)
(Continued)

(52) U.S. Cl.
CPC ........... *H01M 4/366* (2013.01); *H01M 4/131* (2013.01); *H01M 4/1391* (2013.01);
(Continued)

(58) Field of Classification Search
CPC .... H01M 4/366; H01M 4/1391; H01M 4/505; H01M 4/131; H01M 4/525;
(Continued)

(56) References Cited

U.S. PATENT DOCUMENTS

2011/0052991 A1* 3/2011 Kim .................. C01G 51/42
429/231
2013/0260250 A1 10/2013 Yada
(Continued)

FOREIGN PATENT DOCUMENTS

JP 2014-007129 A 1/2014
JP 2014-116129 A 6/2014
(Continued)

OTHER PUBLICATIONS

Notice of Allowance dated Jun. 1, 2021, issued by the U.S. Patent and Trademark Office in U.S. Appl. No. 15/897,703.

*Primary Examiner* — Anca Eoff
*Assistant Examiner* — Kirsten B Tysl
(74) *Attorney, Agent, or Firm* — Sughrue Mion, PLLC (57) ABSTRACT

A method of manufacturing a positive electrode material for lithium ion secondary battery includes the following (α) and (β): (α) a positive electrode active material is prepared; and (β) the positive electrode material for lithium ion secondary battery is manufactured by forming a coat on at least a portion of a surface of the positive electrode active material. The coat is formed to satisfy the following (1) to (3): (1) the coat includes a lithium ion conductor and a ferroelectric substance; (2) the ferroelectric substance is dispersed in the lithium ion conductor; and (3) the lithium ion conductor is interposed at least partially between the positive electrode active material and the ferroelectric substance.

4 Claims, 4 Drawing Sheets

(51) Int. Cl.
  *H01M 4/525*  (2010.01)
  *H01M 4/505*  (2010.01)
  *H01M 4/131*  (2010.01)
  *H01M 4/1391* (2010.01)
  *H01M 4/02*   (2006.01)

(52) U.S. Cl.
  CPC ........... *H01M 4/505* (2013.01); *H01M 4/525* (2013.01); *H01M 10/0525* (2013.01); *H01M 2004/028* (2013.01); *Y02E 60/10* (2013.01); *Y02T 10/70* (2013.01)

(58) Field of Classification Search
  CPC ........ H01M 10/0525; H01M 2004/028; Y02E 60/10; Y02T 10/70
  See application file for complete search history.

(56) References Cited

U.S. PATENT DOCUMENTS

| | | |
|---|---|---|
| 2014/0065298 A1 | 3/2014  | Yanagisawa |
| 2014/0227606 A1 | 8/2014  | Suzuki |
| 2015/0372298 A1 | 12/2015 | Fujieda et al. |
| 2017/0237115 A1 | 8/2017  | Mochizuki |
| 2018/0254477 A1 | 9/2018  | Horikawa et al. |

FOREIGN PATENT DOCUMENTS

| | | |
|---|---|---|
| JP | 2016-39114 A  | 3/2016 |
| JP | 2016-149270 A | 8/2016 |
| JP | 2016-162517 A | 9/2016 |

\* cited by examiner

METHOD OF MANUFACTURING POSITIVE ELECTRODE MATERIAL FOR LITHIUM ION SECONDARY BATTERY AND POSITIVE ELECTRODE MATERIAL FOR LITHIUM ION SECONDARY BATTERY

This is a divisional of application Ser. No. 15/897,703 filed Feb. 15, 2018, which claims priority based on Japanese Patent Application No. 2017-041771 filed on Mar. 6, 2017, the entire contents thereof are incorporated herein by reference.

BACKGROUND

Field

The present disclosure relates to a method of manufacturing a positive electrode material for lithium ion secondary battery and the positive electrode material for lithium ion secondary battery.

Description of the Background Art

Japanese Patent Laying-Open No. 2014-116129 discloses that a positive electrode active material is coated with a ferroelectric substance.

SUMMARY

Japanese Patent Laying-Open No. 2014-116129 is expected to provide an effect of reducing battery resistance by coating the positive electrode active material with the ferroelectric substance (for example, barium titanate or the like). However, generally, it is considered that the ferroelectric substance is poor in lithium (Li) ion conductivity. Hence, desertion and insertion of Li ions are considered to be blocked in the positive electrode active material at its region directly coated with the ferroelectric substance. That is, it is considered that an effective reaction area is decreased on the surface of the positive electrode active material. This is considered to decrease the effect of reducing the battery resistance.

An object of the present disclosure is to provide a positive electrode material for lithium ion secondary battery to allow for a large effect of reducing battery resistance.

Hereinafter, the technical configuration and function and effect of the present disclosure will be described. However, the mechanism of the function of the present disclosure includes presumption. The scope of claims should not be limited depending on whether the presumed mechanism is correct or incorrect.

[1] A method of manufacturing a positive electrode material for lithium ion secondary battery includes the following ($\alpha$) and ($\beta$):

($\alpha$) a positive electrode active material is prepared; and ($\beta$) the positive electrode material for lithium ion secondary battery is manufactured by forming a coat on at least a portion of a surface of the positive electrode active material.

The coat is formed to satisfy the following (1) to (3):

(1) the coat includes a lithium ion conductor and a ferroelectric substance;

(2) the ferroelectric substance is dispersed in the lithium ion conductor; and (3) the lithium ion conductor is interposed at least partially between the positive electrode active material and the ferroelectric substance.

The forming of the coat includes the following ($\beta$1) and ($\beta$2):

($\beta$1) a first layer is formed on the surface of the positive electrode active material; and ($\beta$2) a second layer is layered on the first layer.

The first layer includes the lithium ion conductor.

The second layer includes the lithium ion conductor and the ferroelectric substance.

The coat is formed from the first layer and the second layer.

It is considered that the coat of the present disclosure is a composite material of the Li ion conductor and the ferroelectric substance. In the manufacturing method of the present disclosure, the coat is formed such that the Li ion conductor is at least partially interposed between the positive electrode active material and the ferroelectric substance. Therefore, it is expected to suppress the effective reaction area from being deceased due to the surface of the positive electrode active material being directly coated with the ferroelectric substance.

Further, in the manufacturing method of the present disclosure, the coat is formed such that the ferroelectric substance is dispersed in the Li ion conductor. Accordingly, it is expected that the Li ion diffusion path by the Li ion conductor is formed between the surface of the coat and the surface of the positive electrode active material. Further, it is expected to facilitate diffusion of Li ions by dielectric polarization (alignment of electric dipole) of the ferroelectric substance in the diffusion path (Li ion conductor). With the synergic effect of the above-described functions, it is expected to increase the effect of reducing battery resistance.

The coat of the present disclosure can be formed by layering the second layer including both the Li ion conductor and the ferroelectric substance on the first layer including the Li-ion conductor.

[2] The lithium ion conductor may include a compound or a solid solution. The compound or the solid solution may include: (i) Li; (ii) at least one selected from a group consisting of P, Al, Si, Zr, Ti, Zn, Nb, Ta, and W; and (iii) O or S. The compound or solid solution having such a composition is expected to exhibit Li ion conductivity.

[3] The ferroelectric substance may include a perovskite type oxide.

The perovskite type oxide may be represented by the following formula (I):

$$ABO_3 \qquad (I)$$

where A is different from B,

A includes at least one of Ba and Sr, and

B includes Ti. The perovskite type oxide having such a composition is expected to exhibit ferroelectricity.

[4] The positive electrode active material may include a lamellar rock salt type oxide. The lamellar rock salt type oxide includes at least Li, Ni, Co, Mn, and O. This lamellar rock salt type oxide is expected to have a large specific capacity (capacity per unit mass) and have a low resistance.

[5] A positive electrode material for lithium ion secondary battery includes: a positive electrode active material; and a coat. The coat is formed on at least a portion of a surface of the positive electrode active material. The coat includes a lithium ion conductor and a ferroelectric substance. The ferroelectric substance is dispersed in the lithium ion conductor. The lithium ion conductor is interposed at least partially between the positive electrode active material and the ferroelectric substance. This positive electrode material for lithium ion secondary battery is expected to attain a large effect of reducing battery resistance.

[6] The lithium ion conductor may include a compound or a solid solution. The compound or the solid solution may include: (i) Li; (ii) at least one selected from a group consisting of P, Al, Si, Zr, Ti, Zn, Nb, Ta, and W; and (iii) O or S. The compound or solid solution having such a composition is expected to exhibit Li ion conductivity.

[7] The ferroelectric substance may include a perovskite type oxide.

The perovskite type oxide may be represented by the following formula (I):

$$ABO_3 \tag{I}$$

where A is different from B,

A includes at least one of Ba and Sr, and

B includes Ti. The perovskite type oxide having such a composition is expected to exhibit ferroelectricity.

[8] The positive electrode active material may include a lamellar rock salt type oxide. The lamellar rock salt type oxide includes at least Li, Ni, Co, Mn, and O. This lamellar rock salt type oxide has a large specific capacity and is expected to attain low resistance.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment (hereinafter, referred to as "the present embodiment") of the present disclosure will be described. However, the description below is not intended to limit the scope of claims. In the description below, the term "positive electrode material for lithium ion secondary battery" may be simply described as "positive electrode material."

<Method of Manufacturing Positive Electrode Material for Lithium Ion Secondary Battery>

Figure 1:
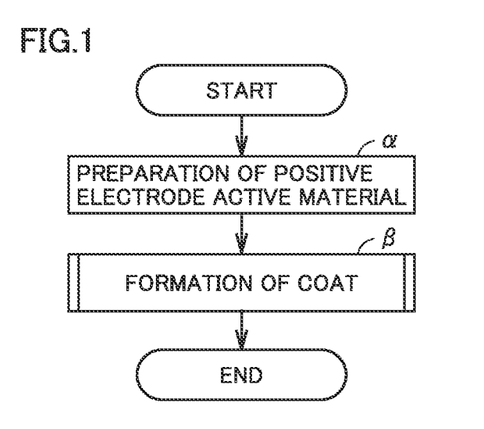
FIG. 1 is a flowchart schematically showing a method of manufacturing a positive electrode material for lithium ion secondary battery according to an embodiment of the present disclosure.

FIG. 1 is a flowchart schematically showing a method of manufacturing a positive electrode material for lithium ion secondary battery according to an embodiment of the present disclosure. The manufacturing method includes "(α) preparation of the positive electrode active material" and "(β) formation of a coat". Hereinafter, a sequence of the manufacturing method will be described.

<<(α) Preparation of Positive Electrode Active Material>>

The manufacturing method of the present embodiment includes preparing the positive electrode active material. The positive electrode active material permits Li ions to be inserted thereinto and deserted therefrom electrochemically. Here, the positive electrode active material may be purchased or may be synthesized. The positive electrode active material may be a particulate matter, for example. Details of the positive electrode active material will be described later.

<<(β) Formation of Coat>>

The manufacturing method of the present embodiment includes manufacturing the positive electrode material by forming the coat on at least a portion of a surface of the positive electrode active material.

The coat of the present embodiment is formed to satisfy the following (1) to (3):

(1) the coat includes a Li ion conductor and a ferroelectric substance;

(2) the ferroelectric substance is dispersed in the Li ion conductor; and (3) the Li ion conductor is interposed at least partially between the positive electrode active material and the ferroelectric substance.

A method of forming the coat should not be limited in particular as long as a coat satisfying the conditions (1) to (3) above can be formed. The coat can be formed by a hydrothermal synthesis method, a sol-gel method, an atomic layer deposition (ALD) method, a chemical vapor deposition (CVD) method, or the like, for example.

Figure 2:
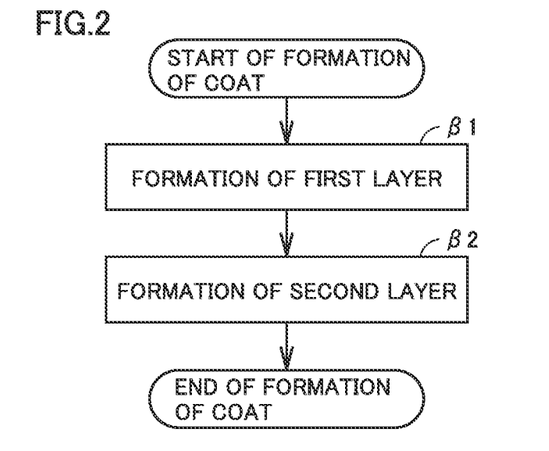
FIG. 2 is a flowchart showing formation of a coat.

FIG. 2 is a flowchart showing formation of the coat. As shown in FIG. 2, the "(β) formation of the coat" includes "(β1) formation of a first layer" and "(β2) formation of a second layer". Here, by way of example, the following describes an embodiment in which the coat (the first layer and the second layer) is formed by the sol gel method.

<<(β1) Formation of First Layer>>

The forming of the coat includes forming the first layer on a surface of the positive electrode active material. The first layer is formed to include the Li ion conductor. In view of an effective reaction area, the first layer is desirably formed to include substantially only the Li ion conductor.

For example, a precursor solution of the Li ion conductor is prepared first. For example, lithium alkoxide and tungsten alkoxide are dissolved in a solvent. Accordingly, the precursor solution of the Li ion conductor (in this example, $Li_2WO_4$) is prepared. This precursor solution will be referred to as "first layer precursor solution" for the sake of convenience.

The positive electrode active material is agitated in the first layer precursor solution. Accordingly, the precursor to be the first layer is adhered on the surface of the positive electrode active material. The solvent is removed by drying. Accordingly, a dry solid matter is collected. The dry solid matter is heated to 300 to 1000° C., for example. The heating temperature can be appropriately changed according to a type of the Li ion conductor. By the heating, the Li ion conductor is generated from the precursor. That is, the first layer is formed on the surface of the positive electrode active material. The first layer includes the Li ion conductor. It is considered that the Li ion conductor included in the first layer is interposed at least partially between the positive electrode active material and a ferroelectric substance described below. Details of the Li ion conductor will be described later.

<<(β2) Formation of Second Layer>>

The forming of the coat includes layering the second layer on the first layer. The second layer is formed to include the Li ion conductor and the ferroelectric substance. The coat is formed from the first layer and the second layer. It should be noted that in the final coat, a boundary between the first layer and the second layer may be unable to be confirmed because the first layer is integrated with the second layer compound.

For example, a precursor solution of the ferroelectric substance is prepared first. For example, barium alkoxide and titanium alkoxide are dissolved in a solvent. Accordingly, a precursor solution of the ferroelectric substance (in this example, $BaTiO_3$) is prepared. Next, the precursor solution of the ferroelectric substance is mixed with the precursor solution of the Li ion conductor. Accordingly, a solution is prepared which includes both the precursor of the Li ion conductor and the precursor of the ferroelectric substance. Hereinafter, this solution will be referred to as "second layer precursor solution" for the sake of convenience.

It should be noted that the Li ion conductor of the first layer may be the same as or different from the Li ion conductor of the second layer.

In the second layer precursor solution, the positive electrode active material including the first layer is agitated. Accordingly, the precursor to be the second layer is adhered to the surface of the first layer. The solvent is removed by drying. Accordingly, a dry solid matter is collected. The dry solid matter is heated to 300 to 1000° C., for example. The heating temperature can be appropriately changed according to types of the Li ion conductor and ferroelectric substance. The Li ion conductor and the ferroelectric substance are generated from the respective precursors by the heating. Accordingly, the second layer is formed. That is, the second layer is layered on the first layer. The coat is formed from the first layer and the second layer.

The second layer includes the Li ion conductor and the ferroelectric substance. It is considered that the ferroelectric substance is dispersed in the Li ion conductor. Details of the ferroelectric substance will be described later.

One set of the "($\beta$1) formation of the first layer" and the "($\beta$2) formation of the second layer" may be repeated multiple times. In the manner described above, the positive electrode material for lithium ion secondary battery in the present embodiment can be manufactured.

<Positive Electrode Material for Lithium Ion Secondary Battery>

Figure 3:
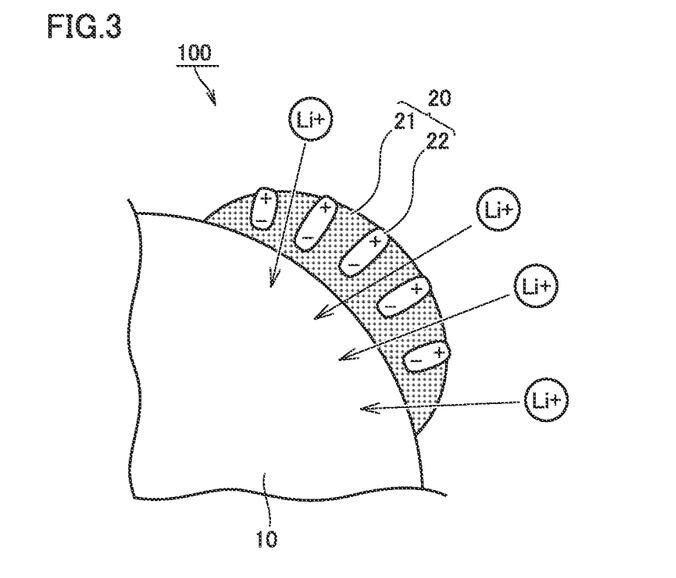
FIG. 3 is a conceptual view showing the positive electrode material for lithium ion secondary battery according to the embodiment of the present disclosure.

FIG. 3 is a conceptual view showing the positive electrode material for lithium ion secondary battery according to the embodiment of the present disclosure. A positive electrode material 100 includes a positive electrode active material 10 and a coat 20. Coat 20 is formed on at least a portion of the surface of positive electrode active material 10. Coat 20 includes a Li ion conductor 21 and a ferroelectric substance 22. Ferroelectric substance 22 is dispersed in Li ion conductor 21. Li ion conductor 21 is interposed at least partially between positive electrode active material 10 and ferroelectric substance 22.

An arrangement of positive electrode active material 10, Li ion conductor 21, and ferroelectric substance 22 can be confirmed by analyzing a cross sectional sample of positive electrode material 100 using a scanning transmission electron microscope-energy dispersive X-ray spectrometry (STEM-EDX) method or the like, for example. The cross sectional sample can be prepared by focused ion beam (FIB) or the like, for example.

In positive electrode material 100, Li ion conductor 21 is interposed at least partially between positive electrode active material 10 and ferroelectric substance 22. Accordingly, it is expected to suppress the effective reaction area from being decreased by ferroelectric substance 22 directly coating the surface of positive electrode active material 10. In view of the effective reaction area, Li ion conductor 21 is desirably interposed entirely between positive electrode active material 10 and ferroelectric substance 22.

Ferroelectric substance 22 is dispersed in Li ion conductor 21. Accordingly, Li ion conductor 21 is expected to form a Li ion ($Li^+$) diffusion path between the surface of coat 20 and the surface of positive electrode active material 10. Further, it is expected to facilitate diffusion of Li ions by dielectric polarization (alignment of electric dipole) of ferroelectric substance 22 in the diffusion path (Li ion conductor 21). With the synergic effect of the above-described functions, it is expected to increase the effect of reducing battery resistance.

Figure 4:
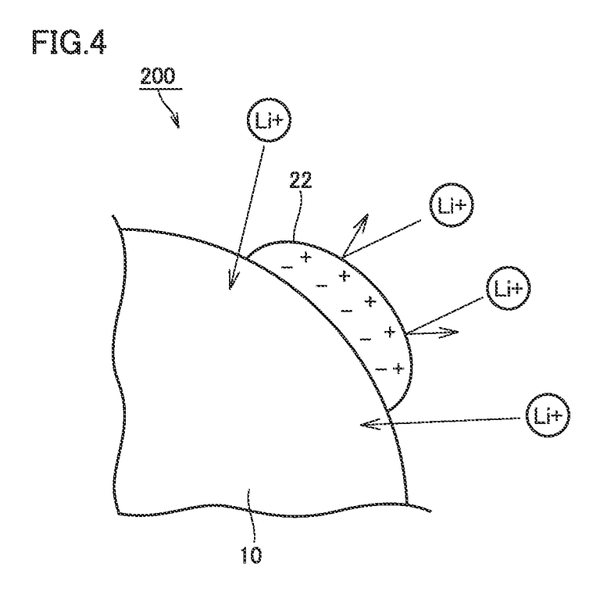
FIG. 4 is a conceptual view showing a positive electrode material for lithium ion secondary battery according to a reference embodiment.

FIG. 4 is a conceptual view showing a positive electrode material for lithium ion secondary battery according to a reference embodiment. In a positive electrode material 200, a ferroelectric substance 22 is directly adhered to a surface of a positive electrode active material 10. Due to dielectric polarization of ferroelectric substance 22, it is considered to facilitate insertion/desertion of Li ions into/from positive electrode active material 10 in the vicinity of ferroelectric substance 22.

However, generally, it is considered that ferroelectric substance 22 is poor in Li ion conductivity. Therefore, it is considered that insertion and desertion of Li ions are blocked in positive electrode active material 10 at the region directly coated with ferroelectric substance 22. That is, it is considered that the effective reaction area is decreased in the surface of positive electrode active material 10. Accordingly, it is considered that the effect of reducing battery resistance is decreased.

The following describes each of the materials in positive electrode material 100 of the present embodiment.

<<Positive Electrode Active Material>>

Positive electrode active material 10 permits Li ions to be inserted thereinto and deserted therefrom electrochemically. Positive electrode active material 10 may be a particulate matter, for example. For example, positive electrode active material 10 may be secondary particles resulting from gathered primary particles. Positive electrode active material 10 may have a uniform composition or may have a composition differing locally. For example, the secondary particles may be formed from two or more types of primary particles having different compositions.

Positive electrode active material 10 (secondary particles) may have an average particle size of 1 to 30 μm, may have an average particle size of 1 to 20 μm, or may have an average particle size of 5 to 15 μm, for example. The "average particle size" in the present specification represents the size of particles at an integrated value of 50% from the finest particle in volume-based particle size distribution measured by a laser diffraction scattering method.

Positive electrode active material 10 should not be limited particularly as long as positive electrode active material 10 permits Li ions to be inserted thereinto and deserted therefrom electrochemically. Examples of the positive electrode active material may include a lamellar rock salt type oxide, a spinel type oxide, an olivine type compound, and the like. The crystal structure of positive electrode active material 10 can be identified by an X-ray diffraction (XRD) method, an electron diffraction method, or the like, for example. The composition of positive electrode active material 10 can be measured by the EDX method or the like, for example.

Examples of the lamellar rock salt type oxide include $LiNiO_2$, $LiCoO_2$, $LiMnO_2$, and the like. The lamellar rock salt type oxide may include at least Li, Ni (nickel), Co (cobalt), Mn (manganese), and O (oxygen). This lamellar rock salt type oxide is also referred to as "ternary lamellar rock salt type oxide". The ternary lamellar rock salt type oxide has a large specific capacity and is expected to attain low resistance.

In the ternary lamellar rock salt type oxide, Ni, Co, and Mn may be partially replaced with a different element. Accordingly, it is expected to improve cycle durability, for example. This is presumably because the partial replacement of the elements leads to a stabilized crystal structure. In the ternary lamellar rock salt type oxide, part of oxygen may be replaced with a halogen element. Accordingly, it is expected to reduce resistance, for example. This is presumably because the concentration of the Li ions is increased near positive electrode active material 10 due to the halogen element, which has high electronegativity, for example.

For example, the ternary lamellar rock salt type oxide may be represented by the following formula (II):

$$Li_{(1+a)}Ni_bCo_cMn_{(1-b-c)}M_dO_{(2-e)}X_e \qquad (II)$$

where a, b, c, d, and e satisfy $0 \le a \le 0.7$, $0.1 \le b \le 0.9$, $0.1 \le c \le 0.4$, $0 \le d \le 0.6$, and $0 \le e \le 0.5$, M is at least one selected from a group consisting of Zr (zirconium), Mo (molybdenum), W (tungsten), Mg (magnesium), Ca (calcium), Na (sodium), Fe (iron), Cr (chromium), Zn (zinc), Si (silicon), Sn (tin) and Al (aluminum), and X is at least one selected from a group consisting of F (fluorine), Cl (chlorine), and Br (bromine).

Examples of the spinel type oxide include $LiMn_2O_4$, $LiNi_{0.5}Mn_{1.5}O_4$, and the like. Examples of the olivine type compound include $LiFePO_4$, $LiMnPO_4$, and the like.

<<Coat>>

Coat 20 is formed at least partially on the surface of positive electrode active material 10. Coat 20 may be formed entirely on the surface of positive electrode active material 10, or may be formed partially on the surface of positive electrode active material 10. Since coat 20 is formed at least partially on the surface of positive electrode active material 10, it is expected to obtain the effect of reducing battery resistance. Coat 20 includes Li ion conductor 21 and ferroelectric substance 22.

<<Li Ion Conductor>>

Li ion conductor 21 of the present embodiment represents a solid that diffuses Li ions therein. Coat 20 may solely include one type of Li ion conductor 21 or may include two or more types of Li ion conductors 21.

The composition of Li ion conductor 21 may be measured by an EDX method or the like, for example. Li ion conductor 21 may also include a compound or a solid solution. The compound or the solid solution may include: (i) Li; (ii) at least one from a group consisting of P (phosphorus), Al, Si, Zr, Ti (titanium), Zn, Nb (niobium), Ta (tantalum), and W; (iii) O or S (sulfur), for example. It is expected that the compound or solid solution having such a composition exhibits Li ion conductivity.

The element(s) in (ii) above may be at least one selected from a group consisting of P, Al, Si, Zr, Ti, Zn, Nb, Ta, W, Mg, Mo, and a rare earth element.

Li ion conductor 21 may be at least one selected from a group consisting of $Li_2WO_4$, $Li_3PO_4$, $LiTaO_3$, $Li_4SiO_4$, $Li_3PO_4$—$Li_4SiO_4$, $Li_2ZrO_3$, $Li_4Ti_5O_{12}$, $LiNbO_3$, $Li_2S$—$P_2S_5$, $Li_3Zn_{0.5}Nb_2O_7$, and $Li_5AlO_3$, for example. Here, "$Li_3PO_4$—$Li_4SiO_4$" represents a solid solution of $Li_3PO_4$ and $Li_4SiO_4$. "$Li_2S$—$P_2S_5$" represents a solid solution of $Li_2S$ and $P_2S_5$.

When Li ion conductor 21 is $Li_2WO_4$, $Li_3PO_4$, or $Li_2ZrO_3$, it is expected to increase the effect of reducing battery resistance. Therefore, Li ion conductor 21 may be at least one selected from a group consisting of $Li_2WO_4$, $Li_3PO_4$, and $Li_2ZrO_3$.

<<Ferroelectric Substance>>

Ferroelectric substance 22 of the present embodiment has spontaneous polarization even when there is no external electric field, and exhibits a crystal in which a direction of polarization is reversed according to a direction of electric field. The crystal structure of ferroelectric substance 22 can be identified by the XRD method, the electron diffraction method, or the like, for example. The composition of ferroelectric substance 22 may be measured by the EDX method or the like, for example.

Ferroelectric substance 22 may be a perovskite type oxide, for example.

The perovskite type oxide may be represented by the following formula (I):

$$ABO_3 \qquad (I)$$

where A is different from B,
A includes at least one of Ba (barium) and Sr (strontium), and
B includes Ti.

It is expected that the perovskite type oxide having such a composition exhibits ferroelectricity. The perovskite type oxide may be at least one of $BaTiO_3$ and $SrTiO_3$.

In the formula (I), A (A site element) may be at least one selected from a group consisting of Pb (lead), Ba, Sr, Bi (bismuth), Li, Na, Ca, Cd (cadmium), Mg, K (potassium), and a lanthanoid element, for example.

In the formula (I), B (B site element) may be at least one selected from a group consisting of Ti, Zr, V (vanadium), Nb, Ta, Sb (antimony), Cr, Mo, W, Mn, Mg, Sc (scandium), Co, Cu (copper), In (indium), Sn, Ga (gallium), Zn, Cd, Fe, Ni, Hf (hafnium), and Al, for example.

<<Application>>

It is expected that positive electrode material 100 attains a large effect of reducing battery resistance. Therefore, it is expected that a lithium ion secondary battery including positive electrode material 100 exhibits a high output. Examples of applications requiring such a high output include power supplies for hybrid vehicles (HV), plug-in hybrid vehicles (PHV), and electric vehicles (EV). However, the applications of the lithium ion secondary battery including positive electrode material 100 should not be limited to such in-vehicle applications. The lithium ion secondary battery including positive electrode material 100 is applicable to any applications.

EXAMPLES

Hereinafter, examples of the present disclosure will be described. The examples below, however, do not limit the scope of claims.

Comparative Example 1

1. Preparation of Positive Electrode Active Material

Ni sulfate, Co sulfate and Mn sulfate were dissolved in pure water such that a molar ratio of Ni, Co and Mn became Ni:Co:Mn=1:1:1. Accordingly, a sulfate aqueous solution was obtained. A sodium hydroxide (NaOH) aqueous solution was dropped to the sulfate aqueous solution. Accordingly, a precursor (coprecipitation hydroxide) of the positive electrode active material was generated. The precursor was cleaned by pure water. The precursor having been cleaned was dried. The precursor having been dried was mixed with lithium carbonate ($Li_2CO_3$). Accordingly, a mixture was obtained. The mixture was heated at 900° C. for 15 hours. Accordingly, a calcinated material was obtained. The calcinated material was pulverized by a ball mill.

In this way, a positive electrode active material ($LiNi_{1/3}Co_{1/3}Mn_{1/3}O_2$) was prepared. This positive electrode active material is a lamellar rock salt type oxide (ternary lamellar rock salt type oxide), and includes Li, Ni, Co, Mn, and O. This positive electrode active material had an average particle size of 10 μm. Hereinafter, this positive electrode active material may be abbreviated as "NCM".

2. Preparation of Positive Electrode Composite Material Paste

The following materials were prepared.
Conductive material: acetylene black
Binder: polyvinylidene fluoride
Solvent: N-methyl-2-pyrrolidone A planetary mixer was employed to mix the positive electrode active material obtained above, a conductive material, a binder, and a solvent. Accordingly, a positive electrode composite material paste was prepared. The solid content composition of the positive electrode composite material paste is as follows: "the positive electrode active material:the conductive material:the binder=84:12:4" in mass ratio. The solid content ratio of the positive electrode composite material paste was 56 mass %.

3. Manufacturing of Positive Electrode Plate

An Al foil in the form of a band was prepared. A die coater was employed to apply the obtained positive electrode composite material paste onto the surface of the Al foil (both the front and rear surfaces) and the positive electrode composite material paste was dried. Accordingly, the positive active material layer was formed on the surface of the Al foil. A roller was employed to roll the positive active material layer and the Al foil. In this way, a positive electrode plate in the form of a band was manufactured.

4. Manufacturing of Lithium Ion Secondary Battery

A negative electrode plate in the form of a band and a separator in the form of a band were prepared. The positive electrode plate, the separator, and the negative electrode plate were layered such that the positive electrode plate and the negative electrode plate face each other with the separator being interposed therebetween, and were then wound into a spiral form. Accordingly, an electrode group was constructed. Terminals were connected to the positive electrode plate and the negative electrode plate, respectively. The electrode group was stored in a battery case. An electrolyte solution was injected into the battery case. The battery case was sealed. In this way, a lithium ion secondary battery was manufactured. Hereinafter, the lithium ion secondary battery may be simply described as "battery".

Example 1

1-1. (α) Preparation of Positive Electrode Active Material

In the same procedure as that in Comparative Example 1, the positive electrode active material (NCM) was prepared.

1-2. (β) Formation of Coat 1-2-1. (β1) Formation of First Layer

Lithium alkoxide and tungsten alkoxide were dissolved in a solvent. Accordingly, a first layer precursor solution was prepared. This first layer precursor solution includes a precursor of $Li_2WO_4$. The positive electrode active material was introduced into the first layer precursor solution such that $Li_2WO_4$ became 0.25 mol % with respect to the positive electrode active material.

The positive electrode active material was agitated in the first layer precursor solution. Accordingly, a precursor to be the first layer is adhered on the surface of the positive electrode active material. The solvent was removed by drying. A dry solid matter was collected. The dry solid matter was heated at 700° C. By the heating, $Li_2WO_4$ was generated from the precursor, thereby forming a first layer.

1-2-2. (β2) Formation of Second Layer

Barium alkoxide and titanium alkoxide were dissolved in a solvent. Accordingly, a precursor solution of the ferroelectric substance was prepared. The precursor solution of the ferroelectric substance and the first layer precursor solution obtained above were mixed. Accordingly, a second layer precursor solution was prepared. This second layer precursor solution includes both a precursor of the Li ion conductor ($Li_2WO_4$) and a precursor of the ferroelectric substance ($BaTiO_3$).

The positive electrode active material including the first layer obtained above was introduced into the second layer precursor solution such that $Li_2WO_4$ became 0.25 mol % and $BaTiO_3$ became 0.5 mol % with respect to the positive electrode active material including the first layer.

In the second layer precursor solution, the positive electrode active material including the first layer was agitated. Accordingly, the precursor to be the second layer is adhered onto the surface of the first layer. The solvent was removed by drying. Accordingly, a dry solid matter was collected. The dry solid matter was heated at 700° C. By the heating, $Li_2WO_4$ and $BaTiO_3$ were generated from the precursors respectively. Accordingly, a second layer was formed. That is, the second layer was layered on the first layer. The coat was formed from the first layer and the second layer. In this way, the positive electrode material according to Example 1 was manufactured. In Example 1, each of $Li_2WO_4$ and $BaTiO_3$ was 0.5 mol % with respect to the positive electrode active material.

As the positive electrode active material, the positive electrode material according to Example 1 was used, and "2. Preparation of Positive Electrode Composite Material Paste", "3. Manufacturing of Positive Electrode Plate" and "4. Manufacturing of Lithium Ion Secondary Battery" were sequentially performed in the same manner as in Comparative Example 1, thereby manufacturing a battery.

Comparative Example 2

In the precursor solution of the ferroelectric substance, the positive electrode active material was agitated. Accordingly, a precursor of the ferroelectric substance was adhered onto the surface of the positive electrode active material. The solvent was removed by drying. Accordingly, a dry solid matter was collected. The dry solid matter was heated at 700° C. By the heating, $BaTiO_3$ was generated from the precursor. In this way, the positive electrode material according to Comparative Example 2 was manufactured. In Comparative Example 2, $BaTiO_3$ was adjusted to 1.0 mol % with respect to the positive electrode active material.

As the positive electrode active material, the positive electrode material according to Comparative Example 2 was used, and "2. Preparation of Positive Electrode Composite Material Paste", "3. Manufacturing of Positive Electrode Plate" and "4. Manufacturing of Lithium Ion Secondary Battery" were sequentially performed in the same manner as in Comparative Example 1, thereby manufacturing a battery.

Comparative Example 3

In the precursor solution of the Li ion conductor, the positive electrode active material was agitated. Accordingly, the precursor of the Li ion conductor was adhered on the surface of the positive electrode active material. The solvent was removed by drying. Accordingly, a dry solid matter was collected. The dry solid matter was heated at 700° C. By the heating, $Li_2WO_4$ was generated from the precursor. In this way, the positive electrode material according to Comparative Example 3 was manufactured. In Comparative Example 3, $Li_2WO_4$ was adjusted to 1.0 mol % with respect to the positive electrode active material.

As the positive electrode active material, the positive electrode material according to Comparative Example 3 was used, and "2. Preparation of Positive Electrode Composite Material Paste", "3. Manufacturing of Positive Electrode Plate" and "4. Manufacturing of Lithium Ion Secondary Battery" were sequentially performed in the same manner as in Comparative Example 1, thereby manufacturing a battery.

Comparative Example 4

In the precursor solution of the ferroelectric substance, the positive electrode active material was agitated. Accordingly, a precursor of the ferroelectric substance was adhered onto the surface of the positive electrode active material. The solvent was removed by drying. Accordingly, a dry solid matter was collected. The dry solid matter was heated at 700° C. By the heating, $BaTiO_3$ was generated from the precursor, thereby forming the first layer. This first layer includes only the ferroelectric substance.

Next, the positive electrode active material including the first layer was agitated in the precursor solution of the Li ion conductor. Accordingly, the precursor to be the second layer was adhered to the surface of the first layer. The solvent was removed by drying. Accordingly, a dry solid matter was collected. The dry solid matter was heated at 700° C. By the heating, $Li_2WO_4$ was generated from the precursor. Accordingly, a second layer was formed. That is, the second layer was layered on the first layer. This second layer includes only the Li ion conductor. The coat was formed from the first layer and the second layer. In this way, the positive electrode material according to Comparative Example 4 was manufactured. In Comparative Example 4, each of $Li_2WO_4$ and $BaTiO_3$ was 0.5 mol % with respect to the positive electrode active material.

As the positive electrode active material, the positive electrode material according to Comparative Example 4 was used, and "2. Preparation of Positive Electrode Composite Material Paste", "3. Manufacturing of Positive Electrode Plate" and "4. Manufacturing of Lithium Ion Secondary Battery" were sequentially performed in the same manner as in Comparative Example 1, thereby manufacturing a battery.

Examples 2 to 11

Each of positive electrode materials according to Examples 2 to 11 was manufactured in the same manner as in Example 1 except that first and second layer precursor solutions were prepared to generate a Li ion conductor shown in Table 1 below, thereby manufacturing a battery.

Examples 12 to 22

Each of positive electrode materials according to Examples 12 to 22 was manufactured in the same manner as in Examples 2 to 11 except that a second layer precursor solution was prepared to generate $SrTiO_3$ as a ferroelectric substance, thereby manufacturing a battery.

<Evaluation>

1. Activation of Battery and Measurement of Initial Capacity

At 25° C., the battery was fully charged by below-described constant current-constant voltage mode charging (CCCV charging). Next, the battery was discharged by below-described constant current mode discharging (CC discharging). The discharge capacity on this occasion was assumed as an initial capacity. It should be noted that "1 C" represents current with which the full charge capacity is discharged in 1 hour.

CCCV charging: CC current=⅓C; CV voltage=4.2V; and cutoff current=⅟₅₀C

CC discharging: current=⅓C; and end voltage=3.0V

2. Evaluation of Battery Resistance

The SOC (State Of Charge) of the battery was adjusted to 56%. On this occasion, the open circuit voltage of the battery was 3.7V. Under a 25° C. environment, the battery was discharged until voltage between the terminals became 3.0V. The discharging was performed by way of the CC discharging. An amount of decrease in the voltage between the terminals 5 seconds after starting the discharge was measured. The amount of decrease in the voltage between the terminals was divided by the discharging current, thereby calculating battery resistance. Results are shown in the column "Battery Resistance" of Table 1 below. The value shown herein is a value obtained by dividing the battery resistance of each example by the battery resistance of Comparative Example 1. It is indicated that as the value is smaller, the effect of reducing battery resistance is larger.

3. Evaluation of Cycle Durability

Under a 60° C. environment, 200 cycles were performed, wherein one cycle represents one set of the following constant current charging (CC charging) and CC discharging.

CC charging: current=2 C and end voltage=4.3 V

CC discharging: current=2 C and end voltage=3.0 V

After the 200 cycles, a post-cycle capacity was measured under the same conditions as those for the initial capacity. By dividing the post-cycle capacity by the initial capacity, a capacity maintenance ratio was calculated. Results are shown in the column "Capacity Maintenance Ratio" in Table 1 below. It is indicated that as the capacity maintenance ratio is higher, the cycle durability is more excellent.

TABLE 1

List of Examples and Comparative Examples

| | Positive Electrode Material for Lithium Ion Secondary Battery | | | | | Battery Performance | |
| --- | --- | --- | --- | --- | --- | --- | --- |
| | Positive Electrode Active Material | Coat | | | | | Capacity Maintenance Ratio [%] |
| | | First Layer | | Second Layer | | Battery Resistance [–] | |
| | | Ferroelectric Substance | Li Ion Conductor | Ferroelectric Substance | Li Ion Conductor | | |
| Comparative Example 1 | NCM | — | — | — | — | 1 | 60 |

TABLE 1-continued

List of Examples and Comparative Examples

| | Positive Electrode Material for Lithium Ion Secondary Battery | | | | | Battery Performance | |
|---|---|---|---|---|---|---|---|
| | Positive Electrode Active Material | Coat | | | | Battery Resistance [−] | Capacity Maintenance Ratio [%] |
| | | First Layer | | Second Layer | | | |
| | | Ferroelectric Substance | Li Ion Conductor | Ferroelectric Substance | Li Ion Conductor | | |
| Comparative Example 2 | NCM | BaTiO$_3$ | — | — | — | 0.80 | 74 |
| Comparative Example 3 | NCM | — | Li$_2$WO$_4$ | — | — | 0.81 | 76 |
| Comparative Example 4 | NCM | BaTiO$_3$ | — | — | Li$_2$WO$_4$ | 0.90 | 66 |
| Example 1 | NCM | — | Li$_2$WO$_4$ | BaTiO$_3$ | Li$_2$WO$_4$ | 0.50 | 93 |
| Example 2 | NCM | — | Li$_3$PO$_4$ | BaTiO$_3$ | Li$_3$PO$_4$ | 0.54 | 91 |
| Example 3 | NCM | — | LiTaO$_3$ | BaTiO$_3$ | LiTaO$_3$ | 0.63 | 92 |
| Example 4 | NCM | — | Li$_4$SiO$_4$ | BaTiO$_3$ | Li$_4$SiO$_4$ | 0.62 | 90 |
| Example 5 | NCM | — | Li$_3$PO$_4$-Li$_4$SiO$_4$ | BaTiO$_3$ | Li$_3$PO$_4$-Li$_4$SiO$_4$ | 0.58 | 91 |
| Example 6 | NCM | — | Li$_2$ZrO$_3$ | BaTiO$_3$ | Li$_2$ZrO$_3$ | 0.50 | 93 |
| Example 7 | NCM | — | Li$_4$Ti$_5$O$_{12}$ | BaTiO$_3$ | Li$_4$Ti$_5$O$_{12}$ | 0.68 | 90 |
| Example 8 | NCM | — | LiNbO$_3$ | BaTiO$_3$ | LiNbO$_3$ | 0.66 | 94 |
| Example 9 | NCM | — | Li$_2$S-P$_2$S$_5$ | BaTiO$_3$ | Li$_2$S-P$_2$S$_5$ | 0.60 | 89 |
| Example 10 | NCM | — | Li$_3$Zn$_{0.5}$Nb$_2$O$_7$ | BaTiO$_3$ | Li$_3$Zn$_{0.5}$Nb$_2$O$_7$ | 0.70 | 87 |
| Example 11 | NCM | — | Li$_5$Al$_2$O$_3$ | BaTiO$_3$ | Li$_5$Al$_2$O$_3$ | 0.68 | 85 |
| Example 12 | NCM | — | Li$_2$WO$_4$ | SrTiO$_3$ | Li$_2$WO$_4$ | 0.55 | 90 |
| Example 13 | NCM | — | Li$_3$PO$_4$ | SrTiO$_3$ | Li$_3$PO$_4$ | 0.57 | 93 |
| Example 14 | NCM | — | LiTaO$_3$ | SrTiO$_3$ | LiTaO$_3$ | 0.64 | 89 |
| Example 15 | NCM | — | Li$_4$SiO$_4$ | SrTiO$_3$ | Li$_4$SiO$_4$ | 0.63 | 94 |
| Example 16 | NCM | — | Li$_3$PO$_4$-Li$_4$SiO$_4$ | SrTiO$_3$ | Li$_3$PO$_4$-Li$_4$SiO$_4$ | 0.62 | 94 |
| Example 17 | NCM | — | Li$_2$ZrO$_3$ | SrTiO$_3$ | Li$_2$ZrO$_3$ | 0.54 | 89 |
| Example 18 | NCM | — | Li$_4$Ti$_5$O$_{12}$ | SrTiO$_3$ | Li$_4$Ti$_5$O$_{12}$ | 0.67 | 89 |
| Example 19 | NCM | — | LiNbO$_3$ | SrTiO$_3$ | LiNbO$_3$ | 0.69 | 92 |
| Example 20 | NCM | — | Li$_2$S-P$_2$S$_5$ | SrTiO$_3$ | Li$_2$S-P$_2$S$_5$ | 0.61 | 90 |
| Example 21 | NCM | — | Li$_3$Zn$_{0.5}$Nb$_2$O$_7$ | SrTiO$_3$ | Li$_3$Zn$_{0.5}$Nb$_2$O$_7$ | 0.71 | 86 |
| Example 22 | NCM | — | Li$_5$Al$_2$O$_3$ | SrTiO$_3$ | Li$_5$Al$_2$O$_3$ | 0.70 | 84 |

<Results>

As shown in Table 1 above, the effect of reducing battery resistance in the Examples are larger than those in Comparative Examples 2 to 4. This is presumably due to the following reason: in each of the Examples, the effective reaction area is suppressed from being decreased by the ferroelectric substance directly coating the surface of the positive electrode active material, and a Li ion diffusion path by the Li ion conductor is formed between the surface of the coat and the surface of the positive electrode active material.

In each of the Examples, an effect of improving cycle durability is also recognized in addition to the effect of reducing battery resistance. In each of the coats of the Examples, it is considered that an effect of suppressing oxidative decomposition of the electrolyte solution is larger than that in each of the coats of the Comparative Examples.

In Comparative Example 4, the effect of reducing battery resistance is small. This is presumably because the effective reaction area is decreased by the ferroelectric substance directly coating the surface of the positive electrode active material. Further, since the ferroelectric substance is not dispersed in the Li ion conductor, it is considered difficult to form a Li ion diffusion path by the Li ion conductor between the surface of the coat and the surface of the positive electrode active material.

In each of the examples in which the Li ion conductors are Li$_2$WO$_4$, Li$_3$PO$_4$, and Li$_2$ZrO$_3$, it is acknowledged that the effect of reducing battery resistance tends to be large.

Although the embodiments of the present disclosure have been described, the embodiments disclosed herein are illustrative and non-restrictive in any respect. The scope of the present disclosure is defined by the terms of the claims, and is intended to include any modifications within the scope and meaning equivalent to the terms of the claims.

What is claimed is:

1. A method of manufacturing a positive electrode material for lithium ion secondary battery, the method comprising:
    preparing a positive electrode active material; and
    manufacturing the positive electrode material for lithium ion secondary battery by forming a coat on at least a portion of a surface of the positive electrode active material,
    the coat being formed such that
        the coat includes a lithium ion conductor and a ferroelectric substance,
        the ferroelectric substance is dispersed in the lithium ion conductor, and
        the lithium ion conductor is interposed at least partially between the positive electrode active material and the ferroelectric substance,
    the forming of the coat including
        forming a first layer on the surface of the positive electrode active material, and
        layering a second layer on the first layer,
    the first layer including the lithium ion conductor,
    the second layer including the lithium ion conductor and the ferroelectric substance, and
    the coat being formed from the first layer and the second layer.

2. The method of manufacturing the positive electrode material for lithium ion secondary battery according to claim 1, wherein
   the lithium ion conductor includes a compound or a solid solution,
   the compound or the solid solution includes
      Li,
      at least one selected from a group consisting of P, Al, Si, Zr, Ti, Zn, Nb, Ta, and W, and
      O or S.

3. The method of manufacturing the positive electrode material for lithium ion secondary battery according to claim 1, wherein
   the ferroelectric substance includes a perovskite type oxide,
   the perovskite type oxide is represented by the following formula (I):

$$ABO_3 \tag{I}$$

where A is different from B,
   A includes at least one of Ba and Sr, and
   B includes Ti.

4. The method of manufacturing the positive electrode material for lithium ion secondary battery according to claim 1, wherein
   the positive electrode active material includes a lamellar rock salt type oxide, and
   the lamellar rock salt type oxide includes at least Li, Ni, Co, Mn, and O.

* * * * *